US012165231B1

(12) United States Patent
Pearson et al.

(10) Patent No.: US 12,165,231 B1
(45) Date of Patent: Dec. 10, 2024

(54) SYSTEM AND METHOD FOR DOCUMENT REVIEW AND APPROVAL

(71) Applicant: Charles Schwab & Co., Inc., San Francisco, CA (US)

(72) Inventors: William Pearson, San Francisco, CA (US); Charles E. Gotlieb, San Francisco, CA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 768 days.

(21) Appl. No.: 16/424,438

(22) Filed: May 28, 2019

Related U.S. Application Data

(60) Provisional application No. 62/676,854, filed on May 25, 2018.

(51) Int. Cl.
*G06F 40/174* (2020.01)
*G06Q 50/18* (2012.01)
*G06V 30/413* (2022.01)
*G06V 30/414* (2022.01)
*G06V 30/416* (2022.01)

(52) U.S. Cl.
CPC .......... *G06Q 50/18* (2013.01); *G06F 40/174* (2020.01); *G06V 30/413* (2022.01); *G06V 30/414* (2022.01); *G06V 30/416* (2022.01)

(58) Field of Classification Search
CPC .................. G06Q 50/18; G06F 40/174; G06K 9/00456; G06K 9/00463; G06K 9/00469
USPC ........................................................ 715/221
See application file for complete search history.

(56) References Cited

U.S. PATENT DOCUMENTS

| | | | | |
|---|---|---|---|---|
| 6,327,611 | B1* | 12/2001 | Everingham | G06Q 10/107 |
| | | | | 709/206 |
| 7,263,655 | B1* | 8/2007 | Carden, Jr. | G06F 40/106 |
| | | | | 707/E17.116 |
| 2004/0085354 | A1* | 5/2004 | Massand | H04L 67/10 |
| | | | | 707/E17.008 |
| 2008/0222112 | A1* | 9/2008 | Morales | G06F 16/3331 |
| | | | | 707/E17.069 |
| 2011/0276875 | A1* | 11/2011 | McCabe | G06F 40/174 |
| | | | | 715/255 |
| 2015/0379294 | A1* | 12/2015 | Cohen | H04L 65/403 |
| | | | | 726/28 |

* cited by examiner

*Primary Examiner* — Stephen S Hong
*Assistant Examiner* — Tionna M Burke
(74) *Attorney, Agent, or Firm* — Harness, Dickey & Pierce, P.L.C.

(57) ABSTRACT

A system and method identifies the review order of a set of documents and then sends documents to parties for review according to the precedence identified. The parties review the documents and provide approvals or rejections. The documents approved may be used to open accounts.

18 Claims, 7 Drawing Sheets

SYSTEM AND METHOD FOR DOCUMENT REVIEW AND APPROVAL

RELATED APPLICATION

This application claims the benefit of U.S. provisional patent application Ser. No. 62/676,854 entitled, "Method and Apparatus for Document Review and Approval" filed by William Pearson and Charles Gotlieb on May 25, 2018, having the same assignee as the present invention and is hereby incorporated by reference in its entirety.

FIELD OF THE INVENTION

The present invention is related to computer hardware and software and more specifically to computer hardware and software for Document Review and Approval.

BACKGROUND OF THE INVENTION

Conventional document approval systems greatly tax the computer system on which they are stored, as a superset of pdf-formatted documents are sent to, and received from, the approving user, all of which must be stored when approved. This increases the storage and transmission costs of distributing the documents.

Additionally, all parties reviewing a set of documents receive all documents, even those the parties are not required to review, making the transmission and storage process inefficient, and allowing documents that may be confidential to be viewed by parties who have no need for them. Different document flows for different parties among a single set of related documents aren't supported at all.

If a user requires a revision, because the entire batch of documents is what is being approved, conventional document approval systems can require the entire set of documents to be revised and the entire batch resent to all parties, an inefficient use of the resources of the computer systems that distribute such documents.

Certain actions may be able to be performed on the completion and/or acceptance of one or more fields in one or more documents. When a conventional document approval system is used, checking for such fields can only be performed manually.

Conventional document approvals systems have no way to update the documents with the most current information. If information is issued or is changed during the document approval process, the latest information may not be made available to subsequent reviewers of the documents.

Additionally, with conventional document approval systems, documents are sent to all parties at the same time. There is no routing mechanism that can handle complex arrangements of documents in which there is an potentially different order to the review of each document and one reviewer may occupy different positions within the reviewing order for each document, requiring complex analysis of what to send to whom for review, and when.

SUMMARY OF INVENTION

A system and method allows fields to be defined and then used in text based forms that are associated with each of multiple types of accounts.

An advisor then selects the types of accounts to be arranged for a set of multiple parties, and provides information about each of the parties in the set, which may include field information to be integrated into the forms and contact information to use to contact the parties to review documents. As contact information, the advisor can specify, for each type of account, one or more parties as an owner, and optionally, one or more parties as a reviewer of an owner. A party may be specified as an owner of one document, but a reviewer of an owner of another document or even the same document. A reviewer reviews documents after the owner has reviewed them, and may be limited as to what he or she can change.

The precedence of the parties is identified, based on ordering rules, such as "the owner of a document reviews it before any of his or her one or more reviewers". In one embodiment, precedence is determined by assigning parties a precedence score, and resolving conflicts in precedence according to a goal, such as minimizing the number of parties that are to review their documents in two or more batches, or minimizing the maximum number of batches any party is to review. Such conflicts arise when owners are also reviewers of other owners. For example if owners A and B each are the reviewers of each other's documents. More complex conflicts can arise when there are more parties and different owners for each of many documents. Conflicts may be resolved by splitting a party into two or more instances of the party.

Links are then sent to the parties that identify the party (or instance of the party if the party is split into two instances when conflicts cannot be avoided) when all of any parties who are to review the documents before the party reviews the documents have reviewed and approved the documents. When the user clicks the link, documents are built for the party that incorporate all of the latest information supplied by the advisor or the parties who previously reviewed the document. The documents can be specified to only incorporate information corresponding to the owner corresponding to the party viewing the document, so for example, if the advisor specified individual accounts for each of two owners, the party will only see the document containing information for one of the owners, either that person's information if the person is an owner, or the owner's information to which a reviewer corresponds, if the party is a reviewer of an owner. Other documents may be specified to contain the information for all their owners, and such documents will include all such information when displayed to a party, although a party may be limited to changing information about that party or optionally the party for which the party is a reviewer.

Any party may change a "comments" field for a document, thereby adding comments for any other reviewer of that document for that party to see.

If the party does not accept a document, the approval of the party who previously reviewed the document may be revoked, so that the previous party will then be allowed to re review the document, and may view the comments field for any comments from the party who did not approve the document. The party not approving the document will also not have an active approval recorded at that point, so other parties dependent on the review and approval of the party who did not approve the document will not see the document and any others they are to review with it. The prior party can then make changes and reapprove the document, which will be sent back to the party who had not approved it, or that prior party can disapprove the document to send it further "upstream", along with comments he or she may add. Each time the document is not approved, the advisor will receive a notice and the comments field for that document.

If the party accepts the document, any changes made are uploaded to a server and will be used to build the documents for any subsequent reviewer of documents containing such changed information. In one embodiment, only the owner of the information can make changes to it and in another embodiment, any other party can make changes. The owner of the information may be the person described by that information or it may be a different person. In one embodiment, the changes are logged in the embodiment in which parties other than the owner can make changes, to allow a record of what was approved and in one embodiment, if a subsequent party changes information, a copy of the information and the version changed is messaged to any party who approved the document previously. Certain information may be required to approve the document, and the document is checked to determine whether the required information has been supplied before approval is processed.

Each time a document has been approved, a check is made from among the parties or instances of parties who also are to approve the document or who are next to approve the document to determine if all documents that subsequent party or instance of the party are ready for review by that subsequent party because all of the documents they are to review have been reviewed by all parties who are to precede them in their review. If so, a link is messaged to such party or parties.

Each time a party approves a document (or, in one embodiment, the advisor completes specifying the documents and completing any field known by that advisor) a check is made to determine whether the information in the document complies with account creation rules. If the information complies with the account creation rules, the account corresponding to the document is created and otherwise it is not created. In one embodiment, even if the advisor supplies information that complies with the account creation rules, the account is not created until the owner approves the document. When the account is created, an account number and other information about the account is received and stored as a field for the corresponding document, and such field may be displayed on the document and reviewed, but not changed, by the parties who subsequently review the document. In one embodiment, the advisor is also notified of the account information for the newly created account.

The advisor may specify that certain owners review some or all documents before other owners (referred to as sequential parties), and such information is used to assign a precedence score that is lower for parties who should review documents before sequential parties with higher scores. When such specification is made, precedence scores for those parties are assigned first, leaving space between the scores for other parties. Any other owners who do not review documents from other owners are then assigned precedence scores before the lowest of the scores assigned to those assigned to the sequential parties. Parties reviewing documents of the sequential parties with the highest precedence scores are assigned precedence scores higher than the highest precedence score assigned to that sequential party, according to whether the party is to review documents of other parties.

As noted above, a party may be both an owner and a reviewer of another owner, in which case the party who is also the reviewer would receive all of their documents after the other party reviews their documents, to avoid having to have the party that is both owner and reviewer from having to review documents twice. However, if each party is each other's reviewer, at least one of the parties may be required to review documents twice. In this case, the party may be split into two instances of the party and considered to be the owner in the first instance and the reviewer in the second instance. As parties are assigned a precedence score as described above, conflicts that require two sets of reviews are identified and the party may be split into instances as required. In some cases, not all documents will have the same owners and reviewers, and so different instances of a party will be assigned different sets of documents. The splits into different instances may be made to minimize the maximum number of instances of a party or to minimize the number of parties split into instances, each of these being a goal.

If there are no sequential parties whose review order is assigned by the advisor, the precedence scores are assigned via a hierarchy of party types, either owners, assigned the lowest precedence scores, or non-owners assigned higher precedence scores, and the precedence scores of parties who are both owners and reviewers are increased. Conflicts are resolved by splitting some or all of the parties into multiple instances as described above.

DETAILED DESCRIPTION OF A PREFERRED EMBODIMENT

Figure 1:
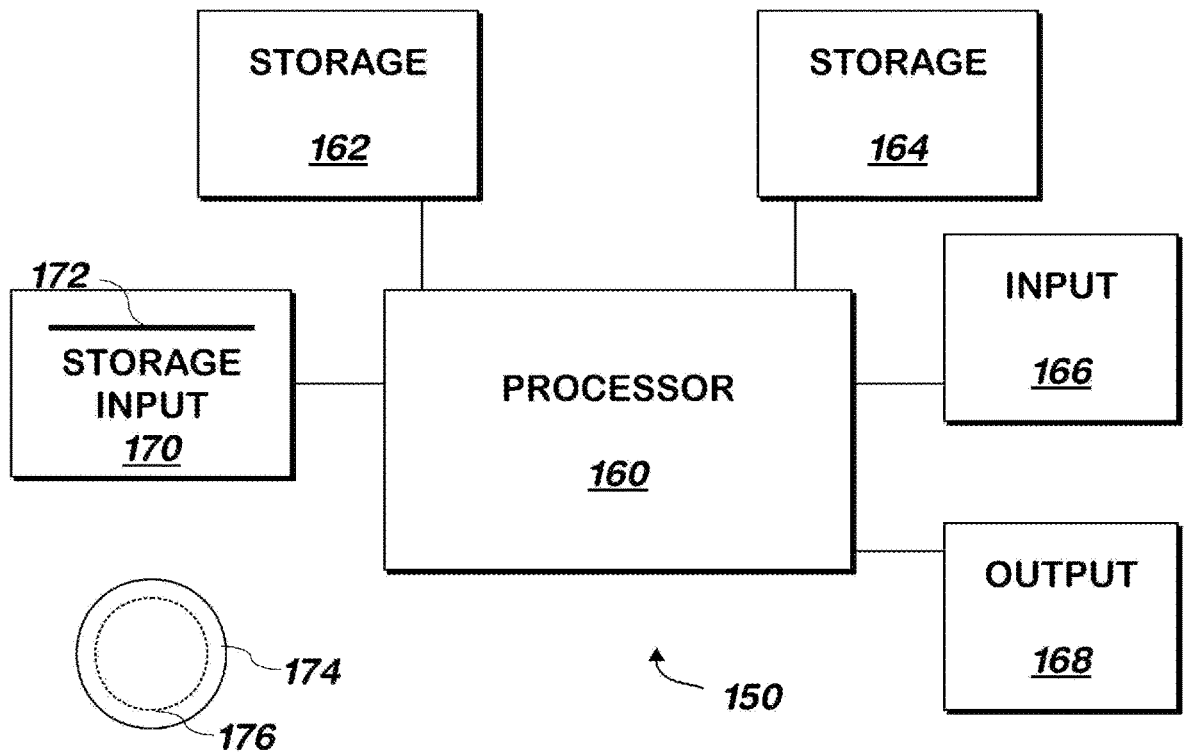
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile (i.e. non-transitory) storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as XP, VISTA, 7 or 8) commercially available from MICROSOFT Corporation of Redmond Washington or a Macintosh computer system running the OS X operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2:
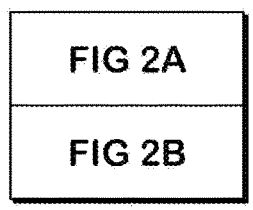
FIG. 2, consisting of FIG. 2A and FIG. 2B, is a flowchart illustrating a method of distributing documents for approval according to one embodiment of the present invention.
Figure 2A:
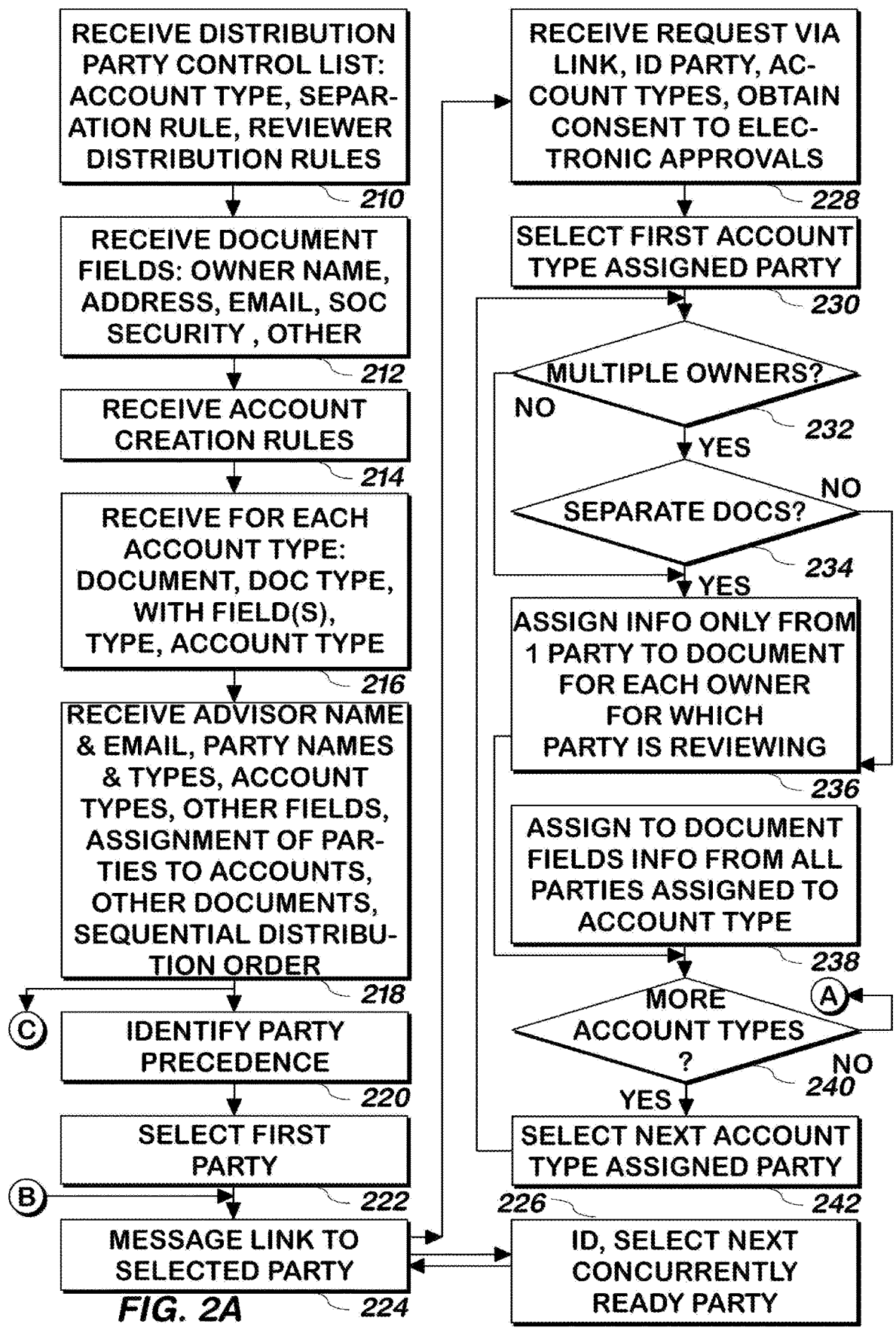
Figure 2B:
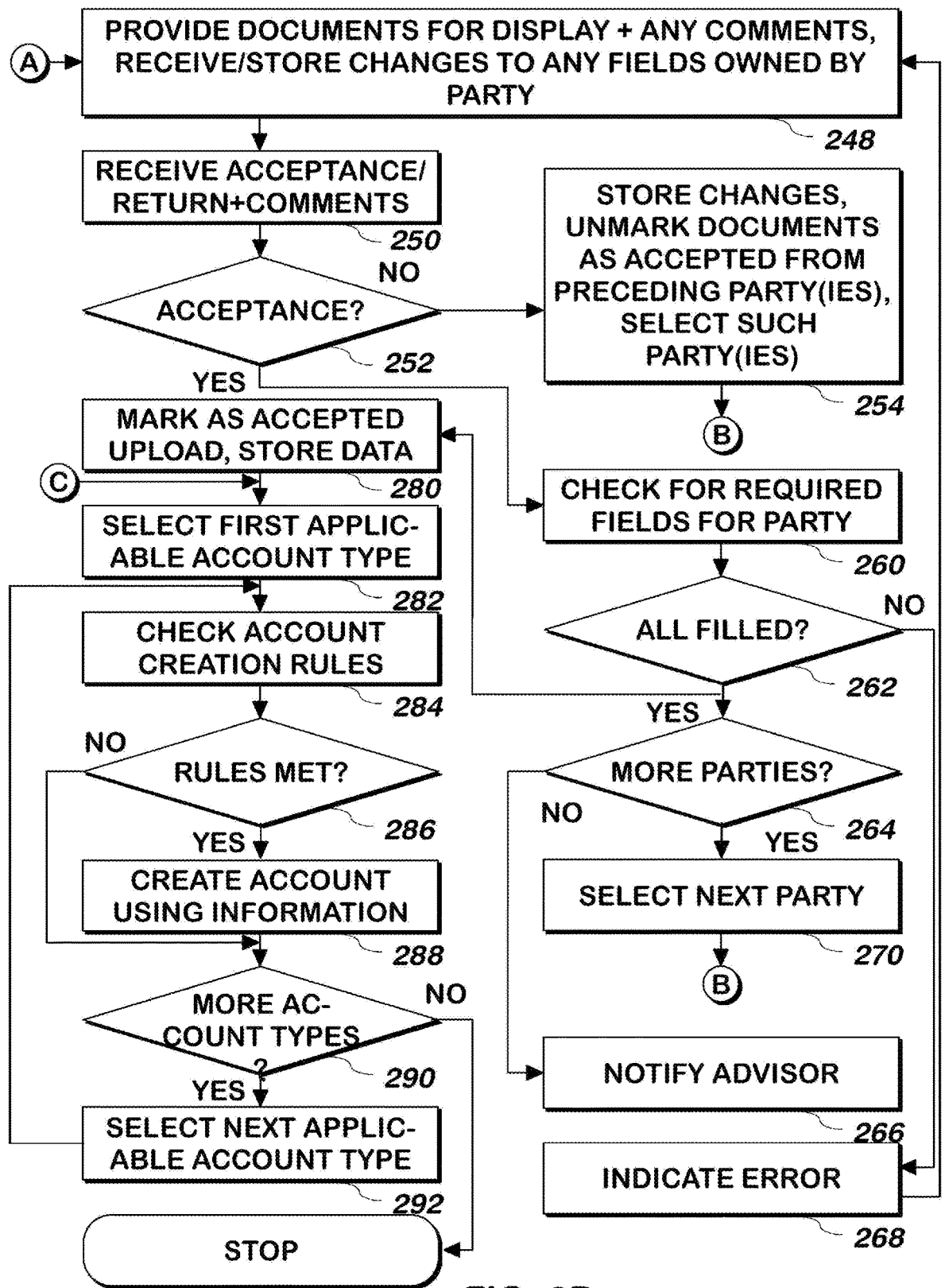
Figure 3A:
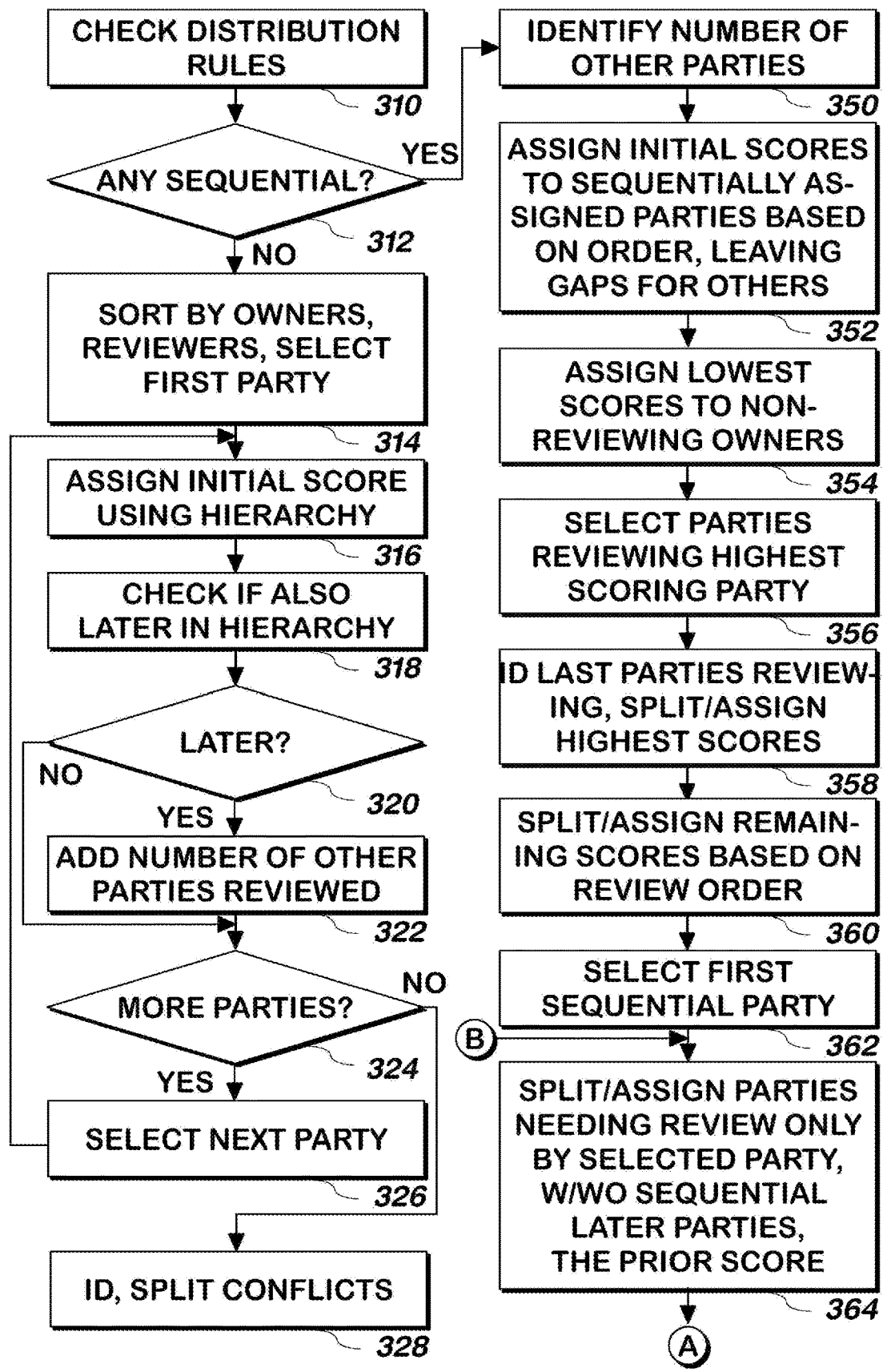
Figure 3B:
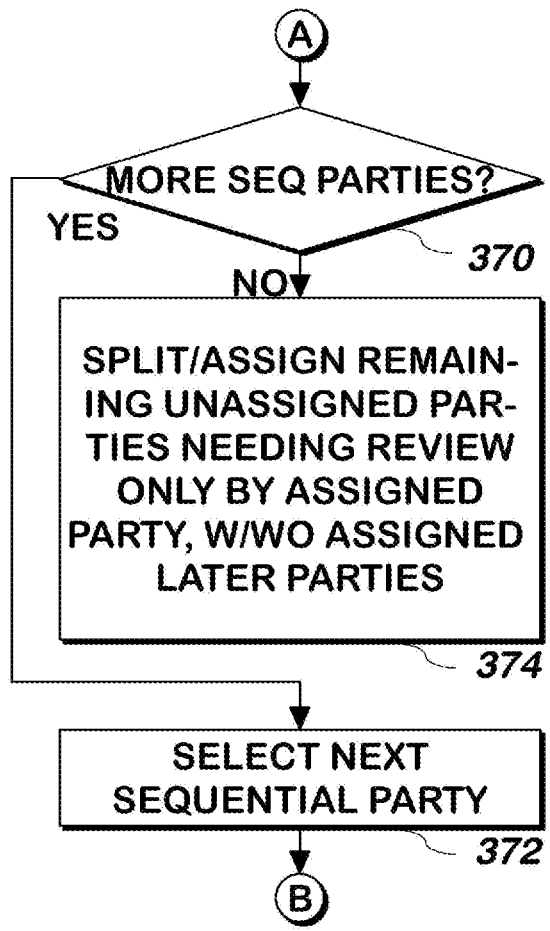

Referring now to FIG. 2, consisting of FIGS. 2A and 2B, a method of receiving information for, and/or approvals of, documents is shown according to one embodiment of the present invention. A distribution party control list is received 210. A distribution party control list describes, for each of several account types, a separation rule defining whether a document for an account of that type should include information from all owners on one document or one owner (the separation rule) on several copies of the document, when there are multiple owners of accounts of that type specified for a group of owners, and an identifier of the distribution rule that should be followed when distributing copies of the document. The separation rule may define the use of one owner on several copies of the document if the account type is an individually owned account type for which multiple owners are specified, for example.

As described in more detail below, the distribution rule may concern how a document that has multiple owners should be distributed: sequentially in order of the parties as they are manually specified by an advisor, or in an automatically generated order, identified to achieve one or more goals. The rule may indicate distribution using an automatically generated order if the advisor is expected to provide most or all of the information on the document, or manually generated sequential order, if the advisor is not expected to supply most or all of the information on the document, so the information on the document should be routed first to people who would be expected to know more of it than others. In this case, a party may receive the document first who would be the most knowledgeable party.

A list of common fields that may be used on each of the documents is received 212. Common fields may include name, address, phone number, etc. In addition to common fields, a document may use any number of four other types of fields that are defined in each document that is received in step 216, one that is required to be filled in by the advisor, one that is required by the advisor or owner, one that is required by the advisor, owner or reviewer, and one that is optional. In one embodiment, the common fields are required to be filled in by the advisor or owner.

One or more account creation rules are received 214. Account creation rules define the field or fields that must be provided or verified by an advisor or party, in order for an account corresponding to the document to be automatically created and optionally an account number field filled in with the account number to be displayed on the document. In one embodiment, there may be different account creation rules for different account types or sets of account types and in another embodiment, there is a single account creation rule: the account is created when a social security number for all owners of that account is entered by an advisor, an owner or, optionally, a reviewer.

For each account type, one or more documents are received 216 along with an identifier of the account type to which the document corresponds. In one embodiment, a document contains text, and optionally images, along with field names that will be replaced with the contents of the field when displayed to a party or the advisor. The field names may be specified as field names using special delimiters around the field name. If a user enters text into a field, the text is considered to be the contents of the field. As used herein, an advisor, owner or reviewer is a "user" and an owner or reviewer is a "party".

Advisor Requests Account Types, Provides Owner, Reviewer Information.

An advisor supplies his or her name and e-mail address either explicitly, or implicitly via log in information the advisor used to log in as an advisor 218. An advisor may be a financial advisor or anyone else setting up accounts or obtaining approvals for documents.

An advisor then provides 218 information about the owners of the accounts into the fields set up for each such purpose, such as name and email address of each owner, and then provides any common field information for each owner, such as residence address if available, phone number if available, social security number if available, and other information if the advisor knows it. The advisor also provides contact information about zero or more reviewers for each owner, such as name and e-mail address. A reviewer is a party who may review some of the documents owned by one or more parties. The reviewer may only review information, or may provide information to a field if the field permissions allow it. A reviewer may be an owner of another account or a party who is not an owner of any account. For example, a reviewer may be an attorney or other entity.

An advisor indicates 218 the account types for which documents are to be created and provides information about the ownership of the various accounts. Ownership information includes the form of ownership (joint owner or individual owner) and the name or names of the owner or owners. For example, the advisor may request a jointly-owned trading account that also has check writing privileges, and two individually owned IRA accounts. The advisor then indicates the party or parties who are owners for each account, and in one embodiment, can select accounts for sequential distribution.

The advisor also indicates 218 any reviewers for each owner, or for each owner of each account type. In the event that any of the account types includes one for which sequential distribution is selected, in one embodiment, the parties assigned to such account types are listed and the advisor supplies 218 the order in which such documents are to be provided to one or more of the owners. In one embodiment, the advisor need not specify the order of all parties assigned to the account type specified for sequential distribution, as the order of one or two such parties may be specified and the others left unspecified, indicating they should follow the parties with a specified order, but their order can be provided automatically. In one embodiment, sequential distribution will use the same order for each document for whichever account types were selected to use them, and in another embodiment, one order may be specified for one account type and a different sequential distribution order may be specified for a different account type.

In one embodiment, the advisor may also identify 218 other documents that may be uploaded by the advisor, and indicate the owners to which the documents should be sent. The reviewer assigned to the owner will also receive any such other document, or will receive it if the advisor so indicates. The advisor then indicates that all such information has been provided. All of the foregoing information is received from the advisor as part of step 218. The method continues at steps 220 and 272, described below.

At step 220, the precedence of the parties is identified. In one embodiment, the owners will receive the documents to be sent to them, and then their reviewers will receive the documents. However, if an owner is also a reviewer, the precedence is determined that the other owners will receive the documents first, and then the owner/reviewers, so that only one set of documents is reviewed by any one reviewer. If however, two owners are each other's reviewer, this goal cannot be achieved, in which case the owners will receive documents, and once reviewed, the reviewers will review them, or one owner is picked at random to be first, and the other owner receives documents after that owner has approved their documents. In that manner, the second owner will then only have to review one set of documents. The first owner will review the second owner's documents after the second owner has reviewed them.

In one embodiment, the precedence may be arranged so that the party who is a reviewer for the highest number of owners will receive documents after those owners have reviewed them, even though the reviewer's documents may be reviewed by another party, so that that person need only review one set of documents. Other goals may be used to identify precedence. In one embodiment, a goal when determining precedence is to minimize the number of owner/reviewers who have to review documents in two or more batches, if possible. In one embodiment, a goal when determining precedence is to minimize the number of people who have to review documents in more than one batch, or more than N batches, where N is a number greater than one.

In one embodiment, a precedence score may be assigned to each user to identify a precedence order in which the parties should be contacted to review documents assigned to them to achieve the precedence goal or goals, with parties receiving multiple batches being split into one instance of the party for each batch the party is to review.

Figure 3:
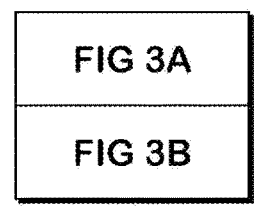
FIG. 3, consisting of FIG. 3A and FIG. 3B, is a flowchart illustrating a method of identifying precedence scores according to one embodiment of the present invention.

Referring now to FIG. 3, a method of assigning precedence to parties reviewing documents is shown according to one embodiment of the present invention. The distribution rules are checked 310 to determine whether any of the account types corresponding to any of the parties has a sequential distribution rule. If not 312, the method continues at step 314, and otherwise 312, the method continues at step 350. Note that a sequential distribution rule distributes documents to specified parties (which may be fewer than all of the parties specified) in a manually specified order, with any other parties distributed documents in an automatically generated order.

The parties are sorted 314 owners first, then non-owner reviewers. The first party is selected. An initial precedence score is assigned 316. In one embodiment, the initial score is assigned based on whether the party is an owner or non-owning reviewer. Owners are assigned an initial score of zero and non owner reviewers are assigned an initial score of one higher than the highest precedence score of the owners for whom the party reviews documents.

A determination is made as to whether the selected party is also next in a hierarchy 318. The hierarchy is owners at the top, next are reviewers of owners only and next are reviewers of other reviewers. A party may be in multiple positions in the hierarchy because they are an owner and a reviewer, for example If the selected user is not also later in the hierarchy 320, the method continues at step 324 and otherwise 320, the number of other parties that are to review any documents to be reviewed by the selected party is identified and added to the precedence score 322. In one embodiment, instead of the number, a weight is assigned to each party for whom the selected party reviews documents and the weight of each party for whom the selected party reviews documents is summed and the sum is added to the selected party's precedence score. The weight for a given party is assigned by classifying the users into levels. In one embodiment, the levels are, from the top: owners who do not review any other party's documents, owners who review other owners' documents, owners who review non-owner reviewer documents, reviewers who review only the documents of owners who do not review other parties' documents, reviewers who review documents of owners who themselves review other parties' documents, and reviewers of reviewers. The weights are assigned as 1 to every member of the first (top) level.

If there are more parties 324, the next party is selected 326 and the method continues at step 316 using the newly selected party, and otherwise 324, in one embodiment, the precedence score identification process is complete, and in another embodiment, conflicts as described above and herein are identified and the party with the conflict is split into two or more instances of the party, each instance with the same contact information but a different set of documents 328, so that documents can be reviewed by a reviewer of an owner after the owner reviewed them. In one embodiment, documents are assigned to each instance cause the most documents that can be reviewed by the party to be reviewed as early as possible, and in another embodiment, as late as possible. Precedence scores are assigned to each instance of the party to assign the lowest possible score while allowing the conflict or conflicts to be resolved with the fewest possible maximum number of splits per person, or the fewest number of people experiencing splits. For example, to allow the fewest number of people to experience splits, one party may require three different reviews of different sets of documents, to avoid other parties from experiencing more than one review of all of their documents. To allow the fewest maximum number of splits per person, the same set of documents may require three different parties to each review two sets of documents per party, to keep the number of sets of documents any one party reviews to two or fewer.

In one embodiment, to split a party into instances of that party, the party is assigned two different identifiers with the same contact information but different sets of documents. In another embodiment, no actual split will occur, and the party will be assigned multiple precedence scores, and all documents available to be reviewed by the party at the time the party's precedence score is next in line to be sent documents (because any other party who must review them prior to the reviewing party has reviewed them) will be sent to the party.

If any of the account types uses a sequential distribution rule 312, the number of other parties who are not assigned a sequence order is identified 350 by subtracting from the total number of parties the number of parties assigned a sequence order and then initial precedence scores are assigned 352 to the parties assigned a precedence score leaving numbering gaps between the others in an amount equal to the number of such other parties identified in step 350. For example, if there are 4 parties and three of them are assigned a sequence order, there will be a gap in their scores of 1 (e.g. by assigning precedence scores of 2, 4, and 6, to the parties in the sequence, for example). If any of the parties in the sequence do not review any other non-sequential documents, such parties are assigned the lowest possible precedence scores and the score of the first party in the sequence is assigned a precedence score of zero and otherwise, the score of the first party in the sequence is assigned a score equal in number to the number identified at step 350.

Precedence scores equal to '1' are assigned 354 to the non-sequentially assigned parties who are owners but do not review any documents.

Any parties who will review other than sequential documents of the highest currently scored party are selected 356 and such parties are assigned scores in review order, starting with the last party reviewing 358 and then working backwards based on the review order to assign 360 the others. The precedence scores assigned will all be higher than the scores of the parties for whom they are reviewing documents, so the number of such parties is added to the highest precedence score assigned to the users in the sequence, to assign a precedence score to the last party reviewing and then the others receive scores to ensure that parties who review a document reviewed by another party have a higher precedence score than such other parties. Parties may be assigned the same precedence score as other parties whose review is not needed before the review by the party.

The first sequential party is selected 362. The first sequential party is the party identified as reviewing before the others in the sequence. Parties owning or reviewing documents needing review by the selected party are assigned 364 a precedence score lower than the currently selected sequential party, as low a score as possible but after any party owning or reviewing documents they review. Some parties may be assigned the same precedence score if there is not a need for one such party to review documents of another such party. In one embodiment, to assign scores, the parties with the fewest number of documents that are reviewed by any party currently not assigned a precedence score are selected first. If there are more sequential parties 370, the next such party is selected 372 and the method continues at step 364, using the newly selected sequentially assigned party, and otherwise 374, the remaining parties are assigned the lowest possible score that is higher than a party having documents that party is to review and is lower than the precedence score of any party that reviews such party's documents. The scores of parties for which no review dependency exists (where one party is required to review documents reviewed by another) that are in a range bounded by the score of at least one sequential parties due to a dependence on that party's review may be the same for parties for which no dependency exists. So for example, if one sequential party is assigned a precedence score of 3 and the next sequential party is assigned a score of 6, and there are two parties to be assigned a score after 3, but there is no dependence between them, they may both be assigned a precedence score of 4.

For example, if party A is to review a sequential document for an account followed by party B, and party C is an owner of a different document for which party A is the reviewer, there is one other party in addition to the parties sequentially reviewing the document. In such case, the score for A and B skips 1 and starts with 2, and skips 1 number between each score assigned. So the scores assigned to A and B are 2 and 4, respectively. Because the other document should be reviewed by party C before party A to minimize the number of times party A receives documents to review, the precedence score assigned to party C is 1. Thus, keeping the scores assigned to the sequential reviewers fixed, the scores for the other parties are then assigned to allow the party for which a document is to be reviewed by one of the parties in the sequence to come after the owner. The parties will review documents in the order of their precedence scores. If there is additionally a party D for which party A is the reviewer, A and B are assigned scores 3 and 6, with parties C and D being assigned a score of 1 each.

As the precedence scores are being assigned herein, any party that cannot be assigned a single score because of conflicts in review order (e.g. A reviews some of B's documents and B reviews some of A's documents) may be split into two instances of the party as described above, with the documents specified for review assigned to each split party instance. It isn't necessary to split all such parties, as a single split may eliminate the conflict. The split will cause the split party to review the fewest (or highest) number of documents in the split party assigned later to resolve the conflict. A party may be split one or more times, one time for each of steps 360 and 364 and as many times as needed in step 374.

Referring again to FIG. 2, a party that is identified in step 220 as being first, for example, due to having the lowest precedence score or scores, is identified 222 and a link is messaged (via e-mail, text, FACEBOOK MESSENGER or other conventional means) 224 to the identified party in a message requesting the party to review the documents that can be viewed by clicking on the link. In one embodiment, the first party is a party that has the lowest precedence score. If parties are tied, one may be chosen at random to be first. The link is a unique identifier that identifies the party or instance of the party, and optionally the set of accounts being addressed. The party clicks the link to the server to which the link corresponds, and the unique identifier provided to the server and is used to identify the party 224. As used herein, a party may include a party or an instance of a party. The method continues at step 226 and 228.

At step 226, any other party whose documents are ready or all ready for review (because any party who is to review them has already reviewed them) is selected and the method continues at step 224 using the newly selected party.

At step 228 the identified party clicks on the messaged link. Consent to electronic approval of documents is obtained 228 and the documents ready for review by that party are identified for the party. Documents ready for review by a party are those corresponding to account types to which the party has been assigned, and any other documents included by the advisor, and for whom approvals have been received by any preceding party. In one embodiment, a preceding party for a document is one that is supposed to review the document and has a precedence score lower than the party the party precedes. In another embodiment, reviewers are assigned a precedence score of 2 and owners are assigned a precedence score of 1, and some or all of the other methods of assigning precedence scores described herein are not used.

The first account type assigned to the identified party is selected 230 and a determination is made whether multiple owners were assigned to that account type as described above. If not 232, the method continues at step 236, and otherwise 232, a determination is made as to whether the account type requires separate documents for each designated owner or if all owners will receive a copy of the same document. If separate documents are to be used 234, the fields included in the document are replaced with the owner's information 236 and the method continues at step 240. If the identified party is an owner, that owner's information is used to create the document. If the identified party is a reviewer, information from the owner for which the party is reviewing documents is used to create the document. For example, if the reviewer is reviewing for one owner, that party's document would be created and the fields for the party being reviewed would be substituted in place of the field names. If the reviewer or instance of the reviewer was reviewing documents for two of three owners, the documents for those two owners would also be created, with a different owner's information substituted for the field names in each of the two documents. If the reviewer is also an owner, that owner's document or documents are also created for the account with that owner's information substituted in place of the field names. An owner's information is information corresponding to that owner, plus any other field values for the document that may have been specified by the advisor or another party. Other field values may include a date, or other information that will be common to all parties corresponding to that document or to the account for that document. The documents are created using conventional merge techniques, including text of the document, but substituting values of fields for field names in the document. Some text may be conditional, appearing for example, based on the number of owners whose information is displayed, or who are assigned the account type for the set of documents being constructed.

In one embodiment, a reviewer will review documents for himself or herself as an owner (if the reviewer is also an owner) and any documents for whom he or she is a reviewer that have been approved by the owner and any preceding reviewers. If multiple reviewers were specified for an account, in one embodiment, the multiple reviewers have no precedence among themselves, or they review sequentially using the sequential order specified as described above. In still another embodiment, the precedence score described herein identifies an order that achieves one or more of the objectives described above. In the event that the reviewers do not review documents simultaneously, a reviewer may review documents only after the other party or parties preceding the reviewer have reviewed and approved those documents to be reviewed by the reviewer. If multiple reviewers are specified for an owner or for a combination of owner and account type, such reviewers may review in the order specified by the advisor, or there may be o precedence with respect to one another.

If the document or documents for the selected account type is to contain the information from multiple owners 232, if the separation rule does not specify separate documents 234, the fields specified in the document are replaced by the information from all of the owners of that document 238. In one embodiment, if the field in the document as defined only exists once on the document, the owners' information replaces the fields for each owner, with each owner on a different line. In another embodiment, the page containing the field is duplicated on the form, one page for each owner. In still another embodiment, if there are multiple instances of the same field in one section of the form, each section will contain the information from a different owner when the fields are replaced with information, with fields not needed left blank. In one embodiment, the distribution party control list contains an indicator for which of the foregoing embodiments to use.

There may be more than one document for the selected account, in which case each document is produced as described above.

If there are more account types assigned to the party as a reviewer or owner, and ready for review because prior reviewing parties have reviewed and approved the document or documents corresponding to such account type 240, the next account type is selected 242 and the method continues at step 232, using the newly selected account type. If there are no more account types assigned to the party that are ready for review 240, the method continues at step 248.

It is noted that, because the documents are assembled and built for the party when the party is ready to review them, the documents have the most currently available information. So, if an owner receives a document that has an out of date address, and the owner corrects it, any reviewer for that owner will see the most current version of the document with the address corrected. This differs from PDF-focused document approval systems in which all parties receive copies of the same document, with only data for the party being modifiable by a party but not visible by any other party.

At step 248, the documents prepared for the party as described above are then provided to that party for display and review by that party. Data is inserted into the field specifications as described above, but in a manner allowing changes by the party. In one embodiment, the data may be changed only by the owner, and in another embodiment, even a reviewer may change data. A comment field may be provided with each document that contains the comments of any party who has previously reviewed the document, even if they did not approve it. Any alternative format documents such as PDFs specified as described above to be sent to the parties are sent to the party if not already sent to that party.

As part of step 248, he party to whom the documents were provided for display then reviews the documents, optionally changes fields (including changing them from empty to not empty). In one embodiment, the party may only change fields if the party is an owner of the document, and so a reviewer may not change a field (other than the comment field) on a document, but may only review the fields on the document and change the comment field. In one embodiment, an owner may change any field on the document and in another embodiment, the owner may only change the fields whose contents correspond to that party, unless the owner is also a reviewer of a party in the embodiments in which reviewers may change fields. For example, if the last name of two owners of an account is misspelled on a document containing information of all of the joint owners, in one embodiment, the owner may change the spelling of their own name but not the spelling of the other owner and in another embodiment, the owner may change the spelling of both last names. In one embodiment, the fields themselves are specified individually as who may change them (either for all documents in step 212 or for each document in step 216): the owner, any owner, or any party.

In one embodiment, the fields used on multiple documents are sourced for display from a local repository that is updated as changes are made. Thus, a user who changes his address on one document will see the changed address on another document that uses the same field.

As noted above, all documents contain a comments field as a default and all parties may modify the comments field and view it. In one embodiment, parties are restricted to appending to the comment field but may not remove prior comments. In one embodiment, any time the comments field is modified, the advisor will receive an email or other message containing the name or other identifier of the party that modified it and the contents of the field. In one embodiment, some, any or all prior parties who reviewed the document will also receive an email or other notification with the updated comment.

Any changes made by a party are received and stored locally by that party's computer system and will be uploaded upon receipt of acceptance or rejection of the documents.

The party indicates acceptance or non acceptance, for example via a user interface element which may be labeled to indicate that non-acceptance of the document will be returned to any preceding party or the advisor. An indication of the acceptance or non-acceptance and the fields or fields changed by that party so indicating are received by the server and stored 250. In one embodiment, some or all of the fields may be specified as required, either on a per field and per document basis for each document, or for all documents, and if the party accepts the documents 252, the fields are checked to ensure the required fields have all been completed 260. In one embodiment, the fields may be indicated in step 212 or 216 as being required by the owner corresponding to the field or the last reviewer of an owner and the fields are checked to ensure that the party responsible for providing them have done so or that another party with access to modifying the field has done so. If all of the fields required by the party indicating acceptance have not been filled 262, an error is indicated to the party providing the acceptance, identifying the required fields not filled in 264, and the method continues at step 248, with the fields continuing to contain the information supplied thus far.

If all of the required fields have been filled in by the party responsible for filling them or by a prior party or the advisor 262, the method continues at steps 280 and 264.

In one embodiment, all documents contain a comments field as a default and all parties may modify it and view it. In one embodiment, any time the comments field is modified, the advisor will receive an email or other message containing the name or other identifier of the party that modified it and the contents of the field. In one embodiment, some, any or all prior parties who reviewed the document will also receive an email or other notification with the updated comment.

As noted, any changes made by a party are received and stored locally by that party's computer system and are uploaded upon receipt of acceptance or rejection of the documents.

At step 264, if there are any more parties or instances to whom documents should be distributed, including instances of parties who may have seen some or all of the documents already as an owner and will now see them as a reviewer, for example, the next such party or parties are selected 260, and the method continues at step 224, using the newly selected parties. Selection of the parties may be performed using the precedence score, and any party or instance of a party with a higher precedence score which has not already been selected is considered a party to whom documents should be distributed, provided that all other parties having a lower precedence score that are to review any of the documents such party is to review, have accepted such documents.

At step 280, the documents provided to the party or instance of the party accepting are marked as accepted by that party and the changed data is uploaded to a server and stored. The method continues at step 282.

If the party did not indicate acceptance 252, the acceptance of the preceding party or parties is revoked, and any changes to the fields are not uploaded and stored, the preceding party or parties are selected 254 and the method continues at step 224, using the newly selected parties. A preceding party is a party who reviewed the document or documents prior to the party indicating non-acceptance. Ordinarily, a preceding party is a party who reviewed the document before the party indicating non-acceptance. However, if that party did not make any changes to the document or documents that were reviewed, and that party's review was not conditioned on the prior reviewing party's review of the document (i.e. they were able to review them in any order), the prior reviewing party may also have their acceptance revoked and that party would be accepted as part of step 254.

In one embodiment, acceptances or rejections are received and processed on a document by document basis. In such embodiment, only the acceptance of a preceding party corresponding to the documents not accepted are revoked and such parties are selected as described above with respect to step 254. With respect to the other documents accepted, such other documents are processed as described above with respect to the steps described herein as beginning at step 260.

At step 282, the first applicable account type is selected. An applicable account is an account for which the party providing acceptance or the advisor (if the advisor has just completed the document creation process that triggered operation of step 270) has permission to change any of the fields on the corresponding document or documents. The information received for such documents is checked to determine whether sufficient information has been received for the creation of an account of the selected account type 284 in accordance with the account creation rules for the account type received in step 214. If sufficient information has been received 276, such account is created 278 using some or all of the information received for the document or documents corresponding to the selected account type and added to the account and an account identifier is received in return and may be added as a field on the document or documents for the selected account type. Otherwise 276, the method continues at step 280.

At step 280, if there are more account types for which the party had permission to change any of the fields (other than the comment field), the next such account type is selected 282 and the method continues at step 274 and otherwise 280, the branch of the flowchart terminates 284.

System.

Figure 4:
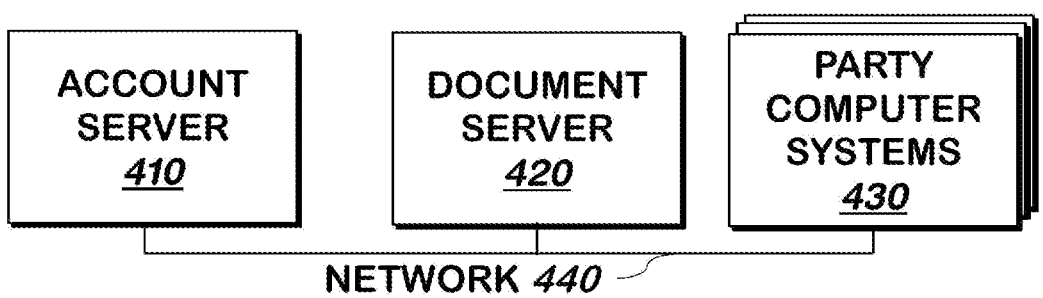
FIG. 4 is a block schematic diagram of a system for securely approving documents, including a server computer system and multiple client computer systems coupled to the server via a network according to one embodiment of the present invention.

FIG. 4 is a block schematic diagram of a system for providing secure document approvals according to one embodiment of the present invention. Account server 410 is a conventional account server computer system that creates and maintains accounts, such as financial accounts. Document server 420 includes a conventional server computer system that operates as described herein to facilitate secure document approvals. Party computer systems 430 include conventional computer systems such as laptop or desktop computers or smartphones running email software and document viewer software such as ADOBE ACROBAT READER commercially available from Adobe Systems, Inc. of San Jose, California. The above systems 410-430 are coupled to one another via network 440, which may include one or more conventional Ethernet networks, the networks of the Internet, or all of these.

Figure 5:
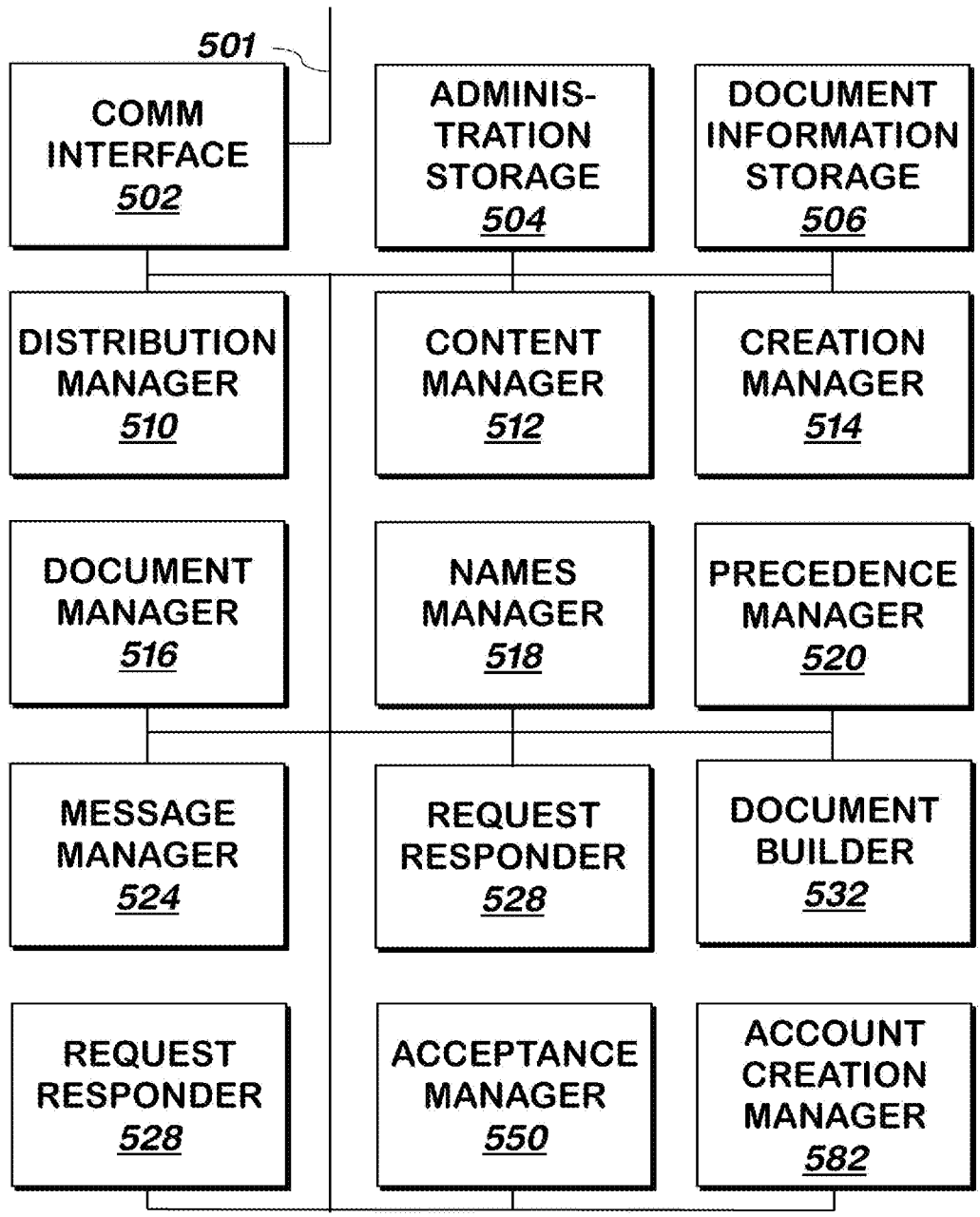
FIG. 5 is a block schematic diagram of the document server of FIG. 4 shown in more detail according to one embodiment of the present invention.

FIG. 5 is a block schematic diagram illustrating document server 420 in more detail according to one embodiment of the present invention.

Communication interface 502 includes a conventional TCP/IP-compatible communication interface running suitable communication protocols such as Ethernet, TCP/IP and other conventional communication protocols, and is coupled to network 440 via input/output 501. All communication into and out of document server 420 is made via input/output 501 of communication interface 502 in one embodiment.

Referring now to FIG. 5, a system for distributing documents to parties for approval is shown according to one Distribution manager embodiment of the present invention. 510 receives and stores into administration storage 504 the distribution party control list from the system administrator as described above. The distribution party control list includes account types, separation rules and review or distribution rules as described above.

Content manager 512 receives and stores into administration storage 504 document field definitions, such as owner name, address, e-mail, Social Security number and other information traditionally associated with documents, such as financial documents used to open accounts at financial institutions. Creation manager 514 receives account creation rules as described above from a system administrator and stores them into administration storage 504. Account creation rules may be received for each of some or all of the account types.

Document manager 516 receives for each account type, a document, such as one containing text and graphics, the document type fields and field type and the account type to which the document corresponds as described above, and stores such information and administration storage 504.

Names manager 518 receives from a system administrator and advisor name and e-mail or other contact information, party names and types, account types, other fields, assignments of each party to one or more account types, other documents, and the sequential distribution order, if any, as described above. Names manager 518 stores such information associated with the advisor name and e-mail into document information storage 506, and signals precedence manager 520.

Precedence manager 520 identifies the party precedence using the information in document information storage 506 and administration storage 504 as described herein, and stores the precedence order of the parties identified into document information storage 506, associated with the advisor name and e-mail. The precedence order may be identified in terms of a precedence score as described in more detail herein. Precedence manager 520 then signals message manager 524.

When signaled, message manager 524 selects the first party as indicated by the precedences of the parties stored in document information storage 506 and sends a link to the selected party, such as via an e-mail message using the email information stored in document information storage 506.

Message manager 524 identifies and selects any other concurrently ready parties as identified by the party precedence and the type of the party and other parties in document information storage 506, sending links to the other selected parties as well, all as described above.

Request responder 528 receives requests via each link sent by message manager 524 and uses the information in the link to identify the party, then uses the information in document information storage 506 to identify the account types corresponding to the party. Instances of parties are treated as separate parties as described herein Request responder 528 provides an identifier of the party from which the request was received to document builder 532.

Document builder 532 selects the first account type assigned to the party corresponding to the identifier it receives, and uses the information in document information storage 506 corresponding to the identifier of the party it receives to identify the account types assigned to the party, and determines whether there are multiple owners of any of the accounts corresponding to the account types assigned to the party. If not, or for any account types for which there are multiple owners, but separate documents are to be provided as indicated in administration storage 504 for that account type, information in document information storage 506 from the party corresponding to the identifier received is assigned by document builder 532 to the document or documents corresponding to the selected account type for each owner for which the party is reviewing. If there are multiple owners for an account type for which separate documents are not to be provided, document builder 532 assigns in document information storage 506 to the document or documents corresponding to the selected account type field, information from all parties assigned to the selected account type, and stores fields from such documents in document information storage 506, associated with the party. Document builder 532 repeats the process described above for each additional account type, if any, assigned to the party corresponding to the identifier it received. When document builder 532 has completed this process, document builder 532 signals request responder 528 with an identifier of the party that clicked the link.

Request responder 528 retrieves from document information storage 506 and administration storage 500 information to compose the documents for such party, including any document text merged with fields and comments made by previously reviewing parties. Fields may include those received from previously reviewing parties. Request responder 528 provides such documents for display in a manner that allows the party to modify the fields owned by that party as were specified to content manager 512 and stored in administration storage 504. Request responder 528 additionally includes user interface elements, such as buttons or links to allow the party to indicate its acceptance or nonacceptance.

If the party clicks the user interface element corresponding to acceptance or otherwise indicates acceptance, acceptance manager 550 and receives and stores into document information storage 506 associated with the document and the party, any changes to any fields owned by the party and any comments, and checks the fields that are required to be provided by the party to make sure that all such fields are filled in or correctly filled in. If not, acceptance manager 550 indicates an error to request responder 528, which redisplays the documents and comments and indicates fields that the party is required to fill in, but have been left empty by the party or for which the field is in an improper format or has another issue as described above, as indicated in administration storage 504. Such redisplay includes the contents of the field stored in document information storage 506. The party may then repeat the process described above.

If all required fields have been properly filled in, acceptance manager 550 stores an indication of the party's acceptance into document information storage 506 and signals message manager 524. Message manager 524 determines whether there are additional parties ready to review documents as described herein based on the acceptance, and precedence of the parties as described herein, account types and party type associated with the party, and if so repeats the process described herein with respect to such parties that are ready.

If the user indicates nonacceptance, acceptance manager 550 receives and stores into document information storage 506 associated with the party and the documents, any changes or comments provided by the party, and unmarks in document information storage 506 any acceptance from the party or parties that immediately preceded the party in review order who indicated such nonacceptance, and whose acceptance triggered the sending of the documents to the nonaccepting party, if any. If there are no such parties, the advisor is considered to be the preceding party. Acceptance manager 550 provides to message manager 524 the identifiers of such preceding party or parties, and message manager 524 repeats the process of sending a link to such parties, who may read review the documents including the comments of the non-accepting party, make suitable changes, and repeat the acceptance process as described above.

Upon acceptance, and after a successful check that all of the required fields have been filled in or properly filled in, acceptance manager 550 additionally signals account creation manager 582 with the identifier of the user who has accepted.

When signaled, account creation manager 582 selects the first applicable account type corresponding to the user whose identifier it received as stored in document information storage 506, and checks the account creation rules in administration storage 504 for the account type to determine if the account creation rules for that account type have been met. The account creation rules may require activities of more users than just the user whose identifier has been received, and the check includes checking for such activities including acceptance and properly formatted account information corresponding to all users associated with the selected account type. If the account creation rules have been met, account creation manager 582 creates an account on account server 410 of FIG. 4, which may create and maintain information related to user accounts, including information that has been received as a field from one or more parties. Such information may include name, address, Social Security number, and other conventional account information. If there are more applicable account types corresponding to the user whose identifier it was received, account creation manager 582 selects the next applicable account type and repeats the process described above using the newly selected account type.

Figure 6:
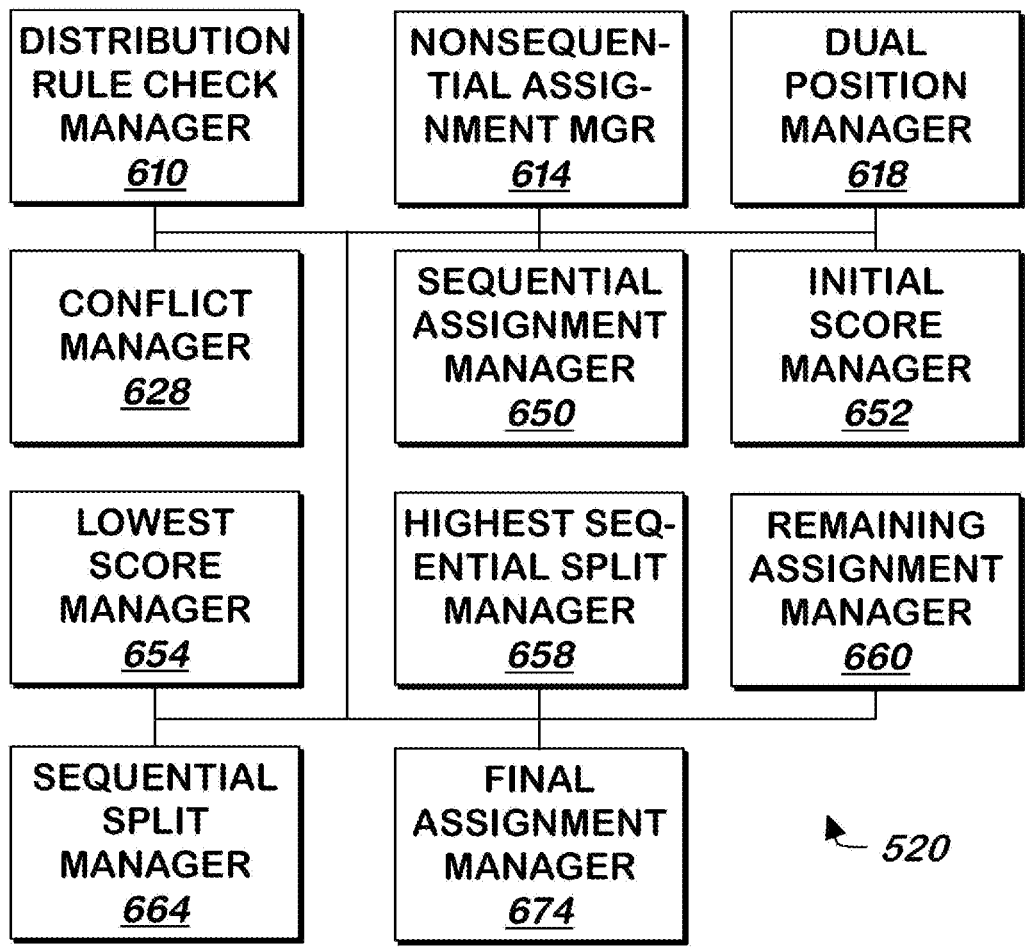
FIG. 6 is a block schematic diagram of a precedence manager of FIG. 5 shown in more detail according to one embodiment of the present invention.

FIG. 6 illustrates precedence manager 520 in more detail according to one embodiment of the present invention. Referring now to FIGS. 5 and 6, distribution rule check manager 610 checks the distribution rules for the account types stored in document information storage 506 and determines if any of the distribution rules for any of the documents specified for the parties based on their account types in document information storage 506 are sequential.

If distribution rule check manager 610 determines that the distribution rules for all of the documents to be sent to the parties are not sequential, distribution rule check manager 610 signals nonsequential assignment manager 614. When so signaled, nonsequential assignment manager 614 sorts the parties so that owners appear first and reviewers of owners only follow the owners, and reviewers of other reviewers are last. If a party qualifies to appear in more than one position in this sorted order because they have more than one client type (e.g. owner of one document, reviewer of another document or even the same document), nonsequential assignment manager 614 assigns the earliest such position to the party in one embodiment, or the latest position in another embodiment.

Nonsequential assignment manager 614 selects the first party in sorted order and assigns an initial score to the selected party as described above. Nonsequential assignment manager 614 provides the initial score and an identifier of the party to dual position manager 618. Dual position manager 618 checks to see if the party could have appeared later (or earlier) in the hierarchy because of the party types assigned to that party, and if so identifies the number of other parties that will review any documents to be reviewed by the party whose identifier it received, and adds such number to the initial score of the selected party. Dual position manager 618 stores into document information storage 506 the initial score, as optionally modified by such addition by dual position manager 618. Dual position manager 618 signals nonsequential assignment manager 614, which repeats the process described above until all parties have been assigned a score. Nonsequential assignment manager 614 then signals conflict manager 628.

When signaled, conflict manager identifies any conflicts as described above, and splits such users into multiple instances, assigning scores and document types assigned to the user before the split to each instance, that allow each such party to review documents after the party for whom they are reviewing as described above, according to one or more of the objectives (e.g. minimize maximum number of times a party receives documents, or minimize the number of parties that will have multiple instances, etc.).

If distribution rule check manager 610 determines that the distribution rules for any of the documents to be sent to the parties are sequential, distribution rule check manager 610 signals sequential assignment manager 650. When signaled, sequential assignment manager 650 identifies the number of other parties who will not be subject to sequential distribution using the information in document information storage 506 and administration storage 504 and provides the number of such other parties to initial score manager 652. Initial score manager 652 assigns in document information storage 506 an initial score to the parties corresponding to the sequential distribution rules based on the order to which such parties were sequentially assigned, such order having been received by names manager 518, as described above and being stored in document information storage 506. Initial score manager 652 signals lowest score manager 654, which assigns in document information storage 506 the lowest scores to any owners of documents who are not also reviewers of documents. These lowest scores are lower than those assigned by initial score manager 652. Lowest score manager 654 signals highest sequential split manager 658, which identifies the last party or parties reviewing as described above with respect to step 358, and assigns in document information storage 506 such parties the highest scores, if necessary splitting such parties into multiple instances according to their party type, and the scores of other users assigned to documents that they are reviewing, or will have reviewed, and the objective or objectives as described above and signals remaining assignment manager 660.

Remaining assignment manager 660 assigns in document information storage 506 scores of remaining users not already assigned as described above, splitting such users if necessary as described herein into multiple instances in document information storage 506 as described above in step 360. Remaining assignment manager 660 signals sequential split manager 664.

Sequential split manager 664 selects the party with the lowest score subject to sequential distribution rule and checks, then splits and assigns in document information storage 506 a new score to the additional instance or instances of such parties as required by their need to review documents owned by users assigned a higher score than they are assigned in document information storage 506. If there are additional parties subject to a sequential distribution rule, sequential split manager 664 selects the party with the next lowest score and repeats the process described above until all such parties subject to sequential distribution rule have been selected and split, if necessary, into one or more instances. When all such parties have been checked and split if needed, sequential split manager 664 signals final assignment manager 674. In one embodiment, to split a user, at least one additional instance of the user is added to the document information storage 506, and the account types assigned to the user are assigned to each instance of the user based on the need to review documents of other users and their scores in document storage 506 in accordance with one or more of the objectives described above. Splitting users may be performed to achieve one or more objectives as described above, such as to minimize maximum numbers of reviews or numbers of parties having to review more than a threshold number of times, or both, as described above.

Final assignment manager 674 splits and assigns a score in document information storage 506 to the additional instances of remaining unassigned parties having account types and party types that indicate some of their documents need review only by an assigned party as described above with respect to step 374.

System elements comprising hardware processors or memory may implement the functions described above. Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Certain Embodiments

Described is a method of routing two or more documents to two or more users, including:
  receiving field definitions for two or more fields;
  receiving, for each of two or more account types:
    a distribution rule that identifies whether a distribution order of any document should be manually specified, at least in part, or automatically generated; and
    at least one document definition including a specification of at least one of the two or more fields;
  receiving at least one account creation rule for at least some of the two or more account types, each account creation rule specifying at least one condition that is to be met for at least one of the two or more fields to allow an account to be automatically created;
  receiving, for each of two or more parties, name and contact information about the party, at least one account type, and at least one party type for each of the at least one account types;
  receiving at least one manually specified distribution order of at least two of the parties in the plurality;
  generating, for each of the parties in the plurality for which the manually specified distribution order was not specified, an automatically specified distribution order responsive to:
    the type of each of the parties in the plurality;
    the at least one manually specified distribution order; and
    the account type of each of the parties in the plurality;
  distributing to each of the parties in the plurality, according to the at least one manually specified distribution order or the automatically specified distribution order, at least one document for the account type received for the respective party, using the at least one document definition for said account type;
  receiving an approval of at least one of the at least one document, from each of the parties in the plurality;
  receiving from at least one of the parties in the plurality, a content of at least one field corresponding to at least one of the field definitions;
  checking at least one of the at least one account creation rule against at least the content of the at least one field received from the at least one of the at least one party; and
  automatically generating an account on a computer server that creates and maintains accounts responsive to the checking and the content received.

The method may additionally include receiving a separation rule for each account type that defines whether joint owners of an account corresponding to the account type will receive at least one document with information about all such owners of the account or will each receive separate documents that contain information about a single owner; and
  whereby each of the documents distributed are built in compliance with the separation rule for the account type to which the document corresponds.

Described is a system for routing two or more documents to two or more users, including:
  a content manager having an input for receiving field definitions for two or more fields, the content manager for providing the definitions for each of the two or more fields at an output;
  a distribution manager having an input for receiving, definitions of two or more account types and for each of the two or more account types, a distribution rule that identifies whether a distribution order of any document should be manually specified, at least in part, or automatically generated, the distribution manager for providing at an output the definitions of the two or more account types and the distribution rule for each of the two or more account types;

a document manager having an input coupled to the distribution manager output for receiving at least a portion of each of the definitions of the two or more account types, and for receiving, for each of the two or more account types, at least one document definition including a specification of at least one of the two or more fields;

a creation manager having an input for receiving at least one account creation rule for at least some of the two or more account types, each account creation rule specifying at least one condition that is to be met for at least one of the two or more fields to allow an account to be automatically created, the creation manager for providing at an output the at least one account creation rule received;

a names manager having an input for receiving, for each of two or more parties, name and contact information about the party, at least one account type, at least one party type for each of the at least one account types, and at least one manually specified distribution order of at least two of the parties in the plurality, the names manager for providing at an output for each of the two or more parties, the name and contact information about the party, the at least one account type, the at least one party type for each of the at least one account types, and the at least one manually specified distribution order of at least two of the parties in the plurality1;

a precedence manager having an input coupled to the names manager for receiving the type of each of the parties in the plurality, the at least one manually specified distribution order of at least two of the parties in the plurality and the account type of each of the parties in the plurality, the precedence manager for generating and providing at an output, for each of the parties in the plurality for which the manually specified distribution order was not specified, an automatically specified distribution order responsive to:
the type of each of the parties in the plurality;
the at least one manually specified distribution order; and
the account type of each of the parties in the plurality;

a message manager/request responder/document builder having an input coupled to the precedence manager output for receiving the automatically specified distribution order and to the names manager for receiving the at least one manually specified distribution order of at least two of the parties in the plurality, the message manager for distributing via an output to each of the parties in the plurality, according to the at least one manually specified distribution order or the automatically specified distribution order, at least one document for the account type received for the respective party, using the at least one document definition for said account type;

an acceptance manager having an input for receiving an approval of at least one of the at least one document, from each of the parties in the plurality and for receiving from at least one of the parties in the plurality, a content of at least one field corresponding to at least one of the field definitions, the acceptance manager for providing at an output an indication of each of the at least one approval of the at least one of the at least one document, and the content of the at least one field;

an account creation manager having an input coupled to the acceptance manager output for receiving the content of the at least one field, and to the creation manager output for receiving the at least one account creation rule, for checking at least one of the at least one account creation rule against at least the content of the at least one field received, and for automatically creating at an output in response to the at least one field corresponding to the at least one account creation rule an account on a computer server that creates and maintains accounts.

The system may contain optional features whereby:
the distribution rule manager input is additionally for receiving a separation rule for each account type that defines whether joint owners of an account corresponding to the account type will receive at least one document with information about all such owners of the account or will each receive separate documents that contain information about a single owner;
the message manager/request responder/document builder input is additionally coupled to the distribution rule manager output for receiving at least one of the separation rules for each account type; and
the message manager/request responder/document builder builds the at least one document in compliance with the separation rule for the account type to which the document corresponds.

Described is a computer program product including a computer useable medium having computer readable program code embodied therein for routing two or more documents to two or more users, the computer program product including computer readable program code devices configured to cause a computer system to:
receive field definitions for two or more fields;
receive, for each of two or more account types:
a distribution rule that identifies whether a distribution order of any document should be manually specified, at least in part, or automatically generated; and
at least one document definition including a specification of at least one of the two or more fields;
receive at least one account creation rule for at least some of the two or more account types, each account creation rule specifying at least one condition that is to be met for at least one of the two or more fields to allow an account to be automatically created;
receive, for each of two or more parties, name and contact information about the party, at least one account type, and at least one party type for each of the at least one account types;
receive at least one manually specified distribution order of at least two of the parties in the plurality;
generate, for each of the parties in the plurality for which the manually specified distribution order was not specified, an automatically specified distribution order responsive to:
the type of each of the parties in the plurality;
the at least one manually specified distribution order; and
the account type of each of the parties in the plurality;
distribute to each of the parties in the plurality, according to the at least one manually specified distribution order or the automatically specified distribution order, at least one document for the account type received for the respective party, using the at least one document definition for said account type;

receive an approval of at least one of the at least one document, from each of the parties in the plurality;

receive from at least one of the parties in the plurality, a content of at least one field corresponding to at least one of the field definitions;

check at least one of the at least one account creation rule against at least the content of the at least one field received from the at least one of the at least one party; and automatically generate an account on a computer server that creates and maintains accounts responsive to the checking and the content received.

The computer program product may additionally include computer program product including computer readable program code devices configured to cause the computer system to receiving a separation rule for each account type that defines whether joint owners of an account corresponding to the account type will receive at least one document with information about all such owners of the account or will each receive separate documents that contain information about a single owner; and may contain additional features whereby each of the documents distributed are built in compliance with the separation rule for the account type to which the document corresponds.

What is claimed is:

1. A method of routing a plurality of documents to a plurality of parties, comprising:

receiving field definitions for a plurality of fields;

receiving, for each of a plurality of account types:
   a distribution rule that identifies whether a distribution order of any document should be automatically generated; and
   at least one document definition including a specification of at least one of the plurality of fields;

receiving at least one account creation rule for at least some of the plurality of account types, each account creation rule specifying at least one condition that is to be met for at least one of the plurality of fields to allow an account to be automatically created;

receiving, for each of the plurality of parties, name and contact information about the party, at least one account type, and at least one party type for each of the at least one account types;

generating an automatically specified distribution order based on: (i) the at least one party type of each of the parties in the plurality, (ii) precedence scores assigned to each of the parties, and (iii) the account type of each of the parties in the plurality by arranging the automatically specified distribution order to minimize, based on the precedence scores, a number of the plurality of parties reviewing the plurality of documents in more than one batch;

routing the plurality of documents to the plurality of parties by distributing, to each of the parties in the plurality, a link according to the automatically specified distribution order with the link to retrieve at least one document not being distributed to each of the parties in the plurality until all of the parties who are to review the at least one document before the party, as indicated in the automatically specified distribution order, review and approve the at least one document, the link enabling retrieval of the at least one document for the account type received for the respective party, using the at least one document definition for said account type;

assembling the at least one document at a time the respective party clicks the link requesting retrieval of the at least one document based on content previously entered by ones of the plurality of parties earlier in the distribution order;

receiving an approval of at least one of the at least one document, from each of the parties in the plurality;

receiving from at least one of the parties in the plurality, a content of at least one field corresponding to at least one of the field definitions;

checking, each time a party approves the at least one document, at least one of the at least one account creation rule against at least the content of the at least one field in the at least one document received from the at least one of the plurality of parties to determine whether the content received for the at least one field contains sufficient information to generate an account of the account type received for the respective party; and automatically creating the account on a computer server based on at least the content of the at least one field inserted into the at least one of the at least one document by the parties, in response to the checking determining that the content received contains sufficient information to generate the account.

2. The method of claim 1, further comprising:
receiving a separation rule for each account type that defines whether joint owners of an account corresponding to the account type will receive at least one document with information about all such owners of the account or will each receive separate documents that contain information about a single owner; and
wherein each of the documents distributed are built in compliance with the separation rule for the account type to which the document corresponds.

3. The method of claim 1, wherein the assembling of the at least one document includes composing the at least one document for the respective party by merging, at the time the respective party requests the at least one document, the at least one document with ones of the plurality of fields and comments made by the ones of the plurality of parties earlier in the distribution order.

4. The method of claim 1, wherein the at least one party type includes owners and reviewers, and the automatically specified distribution order prioritizes ordering the owners before the reviewers.

5. The method of claim 4, wherein the automatically generating an account comprises:
selectively automatically generating the account, only in response to the owners approving the at least one document after the checking determines that the at least one document complies with the at least one account creation rule.

6. The method of claim 5, wherein users include the owners, the reviewers and at least one advisor, and the method further comprises:
notifying the at least one advisor of account information for the account, in response to the generating of the account.

7. A computer system configured to route a plurality of documents to a plurality of parties, the computer system comprising:
a memory; and
processing circuitry configured to execute instructions stored in the memory to configure the computer system to,
receive field definitions for a plurality of fields,
receive, for each of a plurality of account types, a distribution rule that identifies whether a distribution order of any document should be automatically generated, and
at least one document definition including a specification of at least one of the plurality of fields,
receive at least one account creation rule for at least some of the plurality of account types, each account creation rule specifying at least one condition that is to be met for at least one of the plurality of fields to allow an account to be automatically created,
receive, for each of the plurality of parties, name and contact information about the party, at least one account type, and at least one party type for each of the at least one account types,
generate an automatically specified distribution order based on: (i) the at least one party type of each of the parties in the plurality of parties, (ii) precedence scores assigned to each of the parties, and (iii) the account type of each of the parties in the plurality of parties by arranging the automatically specified distribution order to minimize, based on the precedence scores, a number of the plurality of parties reviewing the plurality of documents in more than one batch,
routing the plurality of documents to the plurality of parties by distributing, to each of the parties in the plurality of parties, a link according to the automatically specified distribution order with the link to retrieve at least one document not being distributed to each of the parties in the plurality until all of the parties who are to review the at least one document before the party, as indicated in the automatically specified distribution order, review and approve the at least one document, the link enabling retrieval of the at least one document for the account type received for the respective party, using the at least one document definition for said account type,
assembling the at least one document at a time the respective party clicks the link requesting retrieval of the at least one document based on content previously entered by ones of the plurality of parties earlier in the distribution order,
receive an approval of at least one of the at least one document, from each of the parties in the plurality of parties,
receive from at least one of the parties in the plurality of parties, a content of at least one field corresponding to at least one of the field definitions,
check, each time a party approves the at least one document, at least one of the at least one account creation rule against at least the content of the at least one field in the at least one document received from the at least one of the plurality of parties to determine whether the content received for the at least one field contains sufficient information to generate an account of the account type received for the respective party, and
automatically create the account on a computer server based on at least the content of the at least one field inserted into the at least one of the at least one document by the parties, in response to the check determining that the content received contains sufficient information to generate the account.

8. The computer system of claim 7, wherein the computer system is further configured to,
receive a separation rule for each account type that defines whether joint owners of an account corresponding to the account type will receive at least one document with information about all such owners of the account or will each receive separate documents that contain information about a single owner; and
wherein each of the documents distributed are built in compliance with the separation rule for the account type to which the document corresponds.

9. The computer system of claim 7, wherein the computer system is configured to assemble of the at least one document by composing the at least one document for the respective party by merging, at the time the respective party requests the at least one document, the at least one document with ones of the plurality of fields and comments made by the ones of the plurality of parties earlier in the distribution order.

10. The computer system of claim 7, wherein the at least one party type includes owners and reviewers, and the computer system is configured to generate the automatically specified distribution order by prioritizing ordering the owners before the reviewers.

11. The computer system of claim 10, wherein the computer system is configured to automatically generate the account by,
selectively automatically generating the account, only in response to the owners approving the at least one document after the computer system checks that the at least one document complies with the at least one account creation rule.

12. The computer system of claim 11, wherein users include the owners, the reviewers and at least one advisor, and the computer system is further configured to,
notify the at least one advisor of account information for the account, in response to the generating of the account.

13. A non-transitory computer readable medium having computer readable program code embodied therein that when executed by a computer system, configures the computer system to route a plurality of documents to a plurality of parties by:
receiving field definitions for a plurality of fields;
receiving, for each of a plurality of account types:
a distribution rule that identifies whether a distribution order of any document should be automatically generated; and
at least one document definition including a specification of at least one of the plurality of fields;
receiving at least one account creation rule for at least some of the plurality of account types, each account creation rule specifying at least one condition that is to be met for at least one of the plurality of fields to allow an account to be automatically created;
receiving, for each of the plurality of parties, name and contact information about the party, at least one account type, and at least one party type for each of the at least one account types;
generating an automatically specified distribution order based on: (i) the at least one party type of each of the parties in the plurality, (ii) precedence scores assigned to each of the parties, and (iii) the account type of each of the parties in the plurality by arranging the automatically specified distribution order to minimize, based on the precedence scores, a number of the plurality of parties reviewing the plurality of documents in more than one batch;
routing the plurality of documents to the plurality of parties by distributing, to each of the parties in the plurality, a link according to the automatically specified distribution order with the link to retrieve at least one document not being distributed to each of the parties in the plurality until all of the parties who are to review the at least one document before the party, as indicated in the automatically specified distribution order, review and approve the at least one document, the link enabling retrieval of the at least one document for the account type received for the respective party, using the at least one document definition for said account type;

assembling the at least one document at a time the respective party clicks the link requesting retrieval of the at least one document based on content previously entered by ones of the plurality of parties earlier in the distribution order;

receiving an approval of at least one of the at least one document, from each of the parties in the plurality of parties;

receiving from at least one of the parties in the plurality of parties, a content of at least one field corresponding to at least one of the field definitions;

checking, each time a party approves the at least one document, at least one of the at least one account creation rule against at least the content of the at least one field in the at least one document received from the at least one of the plurality of parties to determine whether the content received for of the at least one field contains sufficient information to generate an account of the account type received for the respective party; and automatically creating the account on a computer server based on at least the content of the at least one field inserted into the at least one of the at least one document by the parties, in response to the checking determining that the content received contains sufficient information to generate the account.

14. The non-transitory computer readable medium of claim 13, wherein the computer readable program code, when executed, further causes the computer system to route the plurality of documents to the plurality of parties by, receiving a separation rule for each account type that defines whether joint owners of an account corresponding to the account type will receive at least one document with information about all such owners of the account or will each receive separate documents that contain information about a single owner; and wherein each of the documents distributed are built in compliance with the separation rule for the account type to which the document corresponds.

15. The non-transitory computer readable medium of claim 13, wherein the assembling of the at least one document includes composing the at least one document for the respective party by merging, at the time the respective party requests the at least one document, the at least one document with ones of the plurality of fields and comments made by the ones of the plurality of parties earlier in the distribution order.

16. The non-transitory computer readable medium of claim 13, wherein the at least one party type includes owners and reviewers, and the automatically specified distribution order prioritizes ordering the owners before the reviewers.

17. The non-transitory computer readable medium of claim 16, wherein the automatically generating an account comprises:

selectively automatically generating the account, only in response to the owners approving the at least one document after the checking determines that the at least one document complies with the at least one account creation rule.

18. The non-transitory computer readable medium of claim 17, wherein users include the owners, the reviewers and at least one advisor, and the computer readable program code, when executed, further causes the computer system to:

notify the at least one advisor of account information for the account, in response to the generating of the account.

\* \* \* \* \*